US009784863B2

(12) United States Patent
Bansal et al.

(10) Patent No.: US 9,784,863 B2
(45) Date of Patent: Oct. 10, 2017

(54) S-WAVE ANISOTROPY ESTIMATE BY AUTOMATED IMAGE REGISTRATION

(75) Inventors: Reeshidev Bansal, Spring, TX (US); Sergey Fomel, Austin, TX (US); Michael P. Matheney, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 432 days.

(21) Appl. No.: 14/239,753

(22) PCT Filed: May 11, 2012

(86) PCT No.: PCT/US2012/037583
§ 371 (c)(1),
(2), (4) Date: Feb. 19, 2014

(87) PCT Pub. No.: WO2013/048580
PCT Pub. Date: Apr. 4, 2013

(65) Prior Publication Data
US 2014/0198614 A1    Jul. 17, 2014

Related U.S. Application Data

(60) Provisional application No. 61/539,302, filed on Sep. 26, 2011.

(51) Int. Cl.
*G01V 1/00* (2006.01)
*G01V 1/28* (2006.01)

(52) U.S. Cl.
CPC .................................. *G01V 1/284* (2013.01)

(58) Field of Classification Search
USPC ......................................................... 367/144
See application file for complete search history.

(56) References Cited

U.S. PATENT DOCUMENTS

| 5,060,203 A | 10/1991 | Winterstein |
| 5,060,204 A | 10/1991 | Winterstein |
| 5,343,441 A | 8/1994 | Alford |
| 5,610,875 A | 3/1997 | Gaiser |

(Continued)

OTHER PUBLICATIONS

Fomel, Sergey, et al. "A multistep approach to multicomponent seismic image registration with application to a West Texas carbonate reservoir study." 2005 SEG Annual Meeting. Society of Exploration Geophysicists, 2005.*

(Continued)

*Primary Examiner* — James Hulka
*Assistant Examiner* — Jonathan Armstrong
(74) *Attorney, Agent, or Firm* — ExxonMobil Upstream Research Company, Law Department

(57) ABSTRACT

The present disclosure provides a system and method for estimating fracture density within a subsurface formation from S-wave seismic data. In one embodiment, the S-wave seismic data is separated into fast ("$S_1$") and slow ("$S_2$") data. A computer is used to compute local similarity of the $S_1$ and $S_2$ data and to compute a cumulative time-difference by which the $S_2$ data lags the $S_1$ data from the local similarity. Based on the computed cumulative time-difference, the fracture density of a subsurface formation is estimated.

8 Claims, 4 Drawing Sheets

(56) References Cited

U.S. PATENT DOCUMENTS

| | | | | |
|---|---|---|---|---|
| 5,835,452 | A | * | 11/1998 | Mueller .................. G01V 1/284 367/75 |
| 5,999,486 | A | * | 12/1999 | DeVault ................. G01V 1/284 367/36 |
| 6,292,754 | B1 | * | 9/2001 | Thomsen ................. G01V 1/28 702/14 |
| 6,862,531 | B2 | * | 3/2005 | Horne .................... G01V 1/286 702/14 |
| 6,898,147 | B2 | | 5/2005 | Jenner et al. |
| 7,355,923 | B2 | | 4/2008 | Reshef et al. |
| 7,660,194 | B2 | | 2/2010 | Uhl et al. |
| 7,924,652 | B2 | | 4/2011 | Tang et al. |
| 2003/0125878 | A1 | | 7/2003 | Bakulin et al. |
| 2003/0167126 | A1 | * | 9/2003 | Horne .................... G01V 1/286 702/14 |
| 2005/0273266 | A1 | * | 12/2005 | Nickel ................... G01V 1/286 702/14 |
| 2008/0033656 | A1 | | 2/2008 | Herwanger |
| 2014/0058678 | A1 | * | 2/2014 | Bansal .................. G01V 1/284 702/14 |

OTHER PUBLICATIONS

Fomel, Sergey, and Long Jin. "Time-lapse image registration using the local similarity attribute." 2007 SEG Annual Meeting, Sep. 23-28, San Antonio, Texas (2007): 2979-2983.*

PCT/US2012/037583. Mar. 28, 2014. Written Opinion of the International Preliminary Examining Authority.*

PCT/US2012/0.37583. Oct. 25, 2013. Written Opinion of the International Preliminary Examining Authority.*

U.S. Appl. No. 14/110,581, filed Oct. 8, 2013, Bansal et al.

Alford, R.M. (1986), "Shear Data in the Presence of Azimuthal Anisotropy: Dilley, Texas," *SEG Expanded Abstracts* 5, pp. 476-479.

Bakulin, A. et al. (2000), "Estimation of fracture parameters from reflection seismic data—Part III: Fractured models with monoclinic symmetry," *Geophysics* 65(6), pp. 1810-1830.

Crampin, S. (1985), "Evaluation of anisotropy by shear-wave splitting," *Geophysics* 50(1), pp. 142-152.

Fomel, S. et al. (2009), "Time-lapse image registration using the local similarity attribute," *Geophysics* 74(2), pp. A7-A11.

Gaiser, J.E. (1999), "Applications for vector coordinate systems of 3-D converted-wave data," *The Leading Edge* 18, pp. 1290-1300.

Granger, P.-Y. et al. (2001), "C-wave resolution enhancement through birefringence compensation in Valhall Field," SEG Int'l. Exp. & Annual Meeting, 4 pgs.

Haacke, R.R. et al. (2009), "Layer stripping of shear-wave splitting in marine PS waves," *Geophysical Journal Int'l.* 176, pp. 782-804.

MacBeth, C. et al. (1991), "Comparison of Signal Processing Techniques for Estimating the Effects of Anisotropy," *Geophysical Prospecting* 39, pp. 357-385.

Ruger, A. et al. (1997), "Using AVO for fracture detection: Analytic basis and practical solutions," *The Leading Edge* 16, pp. 1429-1434.

Schoenberg, M. et al. (1988), "Elastic Wave Propagation in Media with Parallel Fractures and Aligned Cracks," *Geophysical Prospecting* 36, pp. 571-590.

Sinha, B.K. et al. (1994), "Borehole flexural modes in anisotropic formations," *Geophysics* 39(7), pp. 1037-1052.

Thomsen, L. (1999), "Converted-wave reflection seismology over inhomogeneous, anisotropic media," *Geophysics* 64(3), pp. 678-690.

Thomsen, L. et al. (1999), "Coarse-layer stripping of vertically variable azimuthal anisotropy from shear-wave data," *Geophysics* 64(4), pp. 1126-1138.

Winterstein, D.F. et al. (1991), "Shear-wave polarization and subsurface stress directions at Lost Hills field," *Geophysics* 56(9), pp. 1331-1348.

*International Search Report and Written Opinion*, dated Aug. 14, 2012, PCT/US2012/37583.

* cited by examiner

S-WAVE ANISOTROPY ESTIMATE BY AUTOMATED IMAGE REGISTRATION

CROSS-REFERENCE TO RELATED APPLICATION

This application is the National Stage of International Application No. PCT/US2012/037583 that published as WO 2013/048508, filed May 11, 2012, which claims the benefit of U.S. Provisional Application No. 61/539,302, filed Sep. 26, 2011, entitled S-WAVE ANISOTROPY ESTIMATE BY AUTOMATED IMAGE REGISTRATION, each of which is incorporated herein by reference, in its entirety, for all purposes.

FIELD OF INVENTION

This invention generally relates to the field of seismic prospecting and reservoir delineation and, more particularly, to fracture characterization in a subsurface through processing of seismic data. More specifically, the invention involves determining a time-continuous S-wave time-difference volume in the subsurface to estimate or predict fracture intensity (or density) within a subsurface formation.

BACKGROUND

Usually, fracture networks, especially in tight-gas sands, are exploited for efficient hydrocarbon recovery from the reservoirs [1, 2]. Sometimes, hydrocarbon recovery completely relies on the exploitation of the natural fracture networks in the subsurface.

Several geophysical techniques are available for characterizing fracture networks in the subsurface and each has its own advantages and disadvantages. All these techniques can be divided into two broad categories: (1) direct measurements and (2) indirect (or remote) measurements. An example of a direct measurement is a well-bore based method. Usually a geophysical instrument is sent into the well-bore and the geophysical tool measures the subsurface properties such as seismic velocities. These subsurface data are used to predict the fracture properties of the subsurface [3]. Although these types of techniques are very reliable, they provide fracture properties only at the well-bore location. Away from the well-bore, these methods cannot be trusted for fracture characterization.

An example of an indirect or remote measurement is surface seismic method. Surface seismic methods are one of the most common techniques for subsurface imaging. Seismic P- and S-waves are the two types of seismic waves that are used for this purpose. A P-wave source such as dynamite is used to excite P-wave energy which travels down the subsurface and reflects back both as P- and S-waves. These reflected waves are captured by surface receivers. These reflected energies are used to generate subsurface images and to derive other subsurface properties. P-waves are recorded by vertically oriented receivers and S-wave energies are recoded by horizontally oriented receivers. The reflected P-wave energies are traditionally called PP modes and the reflected S-wave energies are called PS or converted-wave modes.

In the past, geophysicists have proposed and implemented a number of techniques to characterize fractures using surface seismic data. Fractured reservoirs are known to behave as an azimuthally anisotropic medium on the scale of seismic wavelengths [4]. Ruger and Tsvankin [5] showed that PP-reflectivity in fractured reservoirs varies with the fracture azimuth. They also gave analytical expressions for PP-reflectivity which could be used to estimate fracture intensity (or density) of the medium. Methods based on this property of the PP-mode are called AVAZ-based methods.

S-waves, also called shear waves, travelling through a fractured medium split into fast ($S_1$) and slow ($S_2$) modes. The particle motions of $S_1$- and $S_2$-waves are polarized parallel and perpendicular to fracture strike, respectively. S-waves polarized parallel to fractures ($S_1$) have a greater velocity than the S-waves polarized perpendicular to fractures ($S_2$). The difference between the fast and slow S-wave velocities is directly proportional to fracture density; i.e. the larger the fracture density, the larger the difference between velocities. This phenomenon is called S-wave birefringence [6]. A number of fracture characterization methods have been proposed based on this property of S-wave [20].

Alford [7, 15] proposed a technique for a vertical seismic profile (VSP) geometry that includes rotating, in a synchronic way, source and receiver geophone by linearly combining the two polarizations. The method requires two orthogonal source components and two orthogonal receiver components. A 2×2 data matrix is formed and the energy in the off-diagonal terms are minimized by tensor rotation. The angle at which the off-diagonal energy is minimized is the azimuth of the fractures in the subsurface. The main disadvantage of this method is that the estimated fracture properties are only reliable at the VSP location.

Winterstein and Meadows [8] reported that the subsurface rarely has only one fractured layer; instead, many fractured layers with varying fracture orientations are more common They proposed a coarse-layer stripping technique to deal with this problem. The following is the idea behind their method; first rotate and find the time-difference between $S_1$ and $S_2$ for the arrivals from the bottom of the first fractured layer, then subtract the one- or two-way time (depending on whether the data is VSP or surface seismic) from the arrivals from the bottom of next fractured layer and correct for time lag by the first fractured layer. The procedure is repeated for subsequent fractured layers.

Gaiser [9, 14] extended the method of Alford [7, 15] to characterize subsurface fractures using surface seismic PS data. Unlike the method of Alford [7, 15], Gaiser's technique uses surface seismic data for fracture characterization. Gaiser's method can also perform coarse layer-stripping in the presence of multiple fractured layers.

Bansal et al. [18] developed a method to perform true-amplitude layer-stripping using surface seismic PS data. Unlike the method of Gaiser [9, 14], Bansal's method perform a scan of offset and azimuths of the surface seismic data to obtain the optimum dataset to perform layer stripping. This method also produces true-amplitude fast and slow S-waves which can be used to perform seismic inversion to in order to predict the lithology of the subsurface.

All the previous fracture characterization methods require the data to be divided in several time windows before layer-stripping is performed to compute the slow S-wave time-lag and the fracture orientation. The estimated S-wave time-lag represents the cumulated traveltime difference between the fast and slow S-waves in a given time window. In order to locate the highly fractured zones, length of the analysis time windows should be as short as possible such that the estimated S-wave time-lag represents the local anisotropy strength and not a cumulative effect.

In the field data, however, the length of time windows depends on the signal-to-noise ratio. The time-difference between the fast S-wave ($S_1$) and slow S-wave ($S_2$) modes are computed by cross-correlating the reflection events in the given window. If the time windows are small and the signal-to-noise ratio is not sufficient enough, cross-correlation process becomes unstable. This limitation on the conventional layer-stripping usually forces one to choose large time windows for analysis. This problem becomes more aggravated in land converted-wave (PS) and pure S-wave data which are notoriously noisy. The noise precludes identifying highly anisotropic zones from moderately anisotropic or isotropic zones.

Thus, there is a need for improvement in this field.

SUMMARY OF THE INVENTION

The present invention provides an improved system and method for fracture characterization in a subsurface formation using geophysical seismic data.

In one embodiment, the invention is a computer-implemented method for estimating fracture density within a subsurface formation from S-wave seismic data, the method comprising: separating the S-wave seismic data into fast ("$S_1$") and slow ("$S_2$") data; using a computer to compute local similarity of the $S_1$ and $S_2$ data; using a computer to compute a cumulative time-difference by which the $S_2$ data lags the $S_1$ data from the local similarity; and estimating the fracture density from the computed cumulative time-difference.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DESCRIPTION OF THE SELECTED EMBODIMENTS

The disclosed methodology describes a process to generate a time-continuous time-difference volume between the fast S-wave ($S_1$) and slow S-wave ($S_2$) modes. The time-difference between $S_1$ and $S_2$ modes is an indicator of fracture intensity within a subsurface formation. As a result, a larger time-difference indicates a larger fracture intensity or density. This new, additional information will help to locate highly anisotropic or fractured zones: critical information for well planning in unconventional reservoirs. As used throughout this document, a time-continuous volume is understood mean an attribute volume in which there is a defined value at each time sample.

Figure 1:
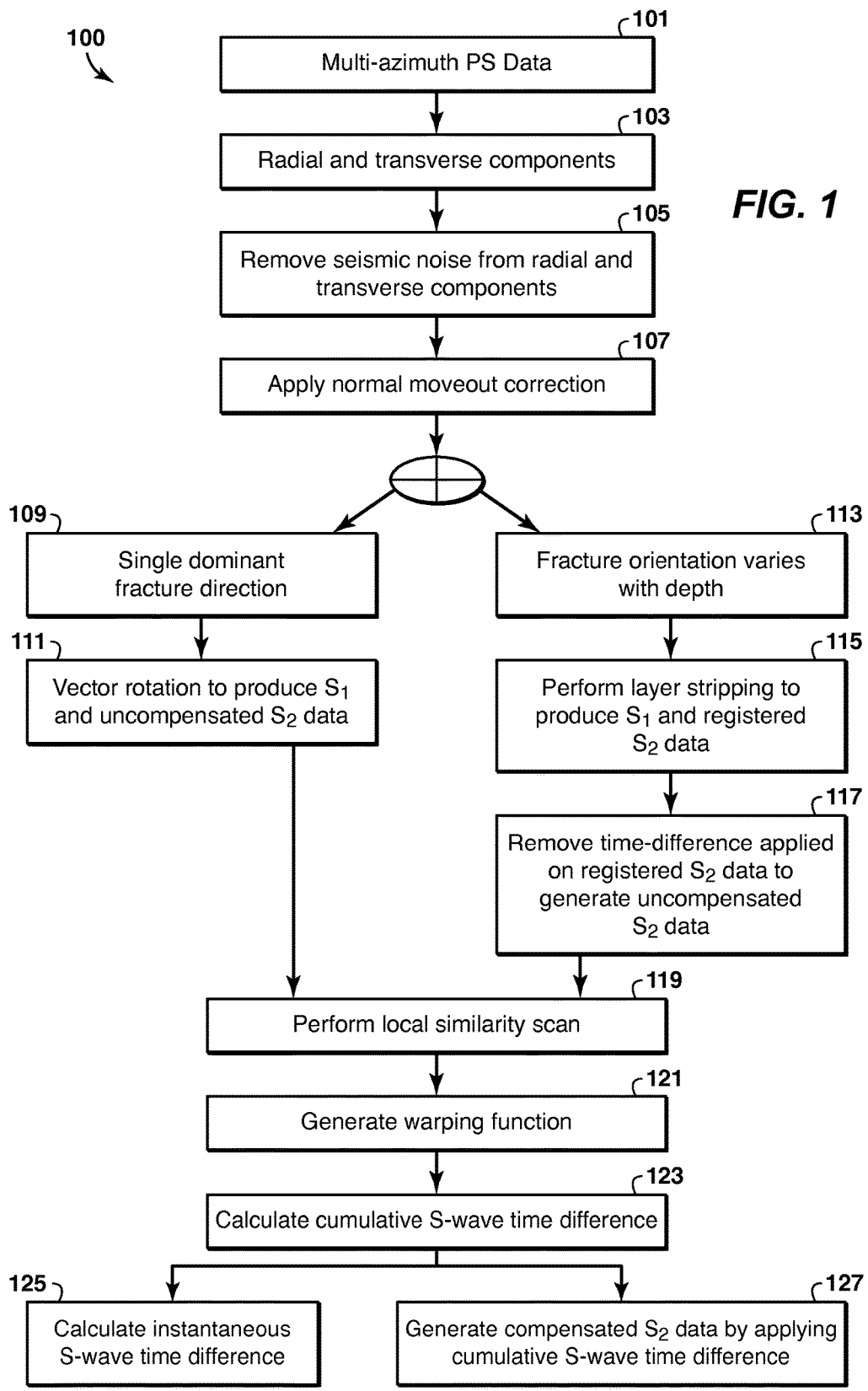
FIG. 1 is a flow chart showing basic steps for the fracture characterization according to one embodiment of the present disclosure.

The flowchart of FIG. 1 will be referred to in describing one embodiment of the present disclosure. The depicted process (100) first requires acquisition of multi-component, multi-azimuth data (101). Azimuth is defined for a particular source-receiver combination. The direction (relative to true North or some other reference direction) of the line connecting a source-receiver pair is called the azimuth of that particular source-receiver pair and associated seismic data. Traditionally, only the vertical component of the seismic wavefield, which is dominated by the P-wave energy, is acquired. For certain applications, all three vector components of the wavefield are also acquired (using a motion-detector type of seismic receiver).

In this type of acquisition, a P-wave source is used which may be, but is not limited to, dynamite, a vertical vibrator, or air gun. The vertical component of the data mostly contains P-wave energy and the two horizontal components carry converted-wave PS energy. The PS energy is defined as the P-wave energy reflected back from a reflector as S-wave energy; i.e., P-wave goes down and some of that energy is reflect back up in an S-wave mode.

The process continues as the acquired PS energy is rotated or resolved into radial (direction along the line connecting source to receiver) and transverse (direction perpendicular to the line connecting source to receiver) components (103). Free-surface related seismic noise, such as surface-waves and free-surface multiples, is then removed from the radial and transverse components (105). After noise correction, normal moveout (NMO) correction is applied (107) on the data to flatten the reflections. In other embodiments, the reflections may be flattened by pre-stack time migration. Though not depicted in FIG. 1, some embodiments may include the additional step of stacking the flattened data. By stacking the data, the signal-to-noise ratio may be improved. As appreciated by those skilled in the relevant art, steps 101-107 are standard processing steps and are routinely applied in seismic data processing.

The two horizontal components of the recorded wavefields, which primarily have S-wave reflected energies, carry a mixture of fast and slow S-waves. The S-wave data recorded over a fractured subsurface is seldom separated in pure $S_1$ and $S_2$ modes. In order to do so, the horizontal components (radial and transverse components) first need to be rotated to fast and slow S-wave directions before $S_1$ and $S_2$ images can be time-aligned. The way this is done is dependent upon whether there is a single dominant fracture direction in the subsurface. If there is only a single dominate fracture direction in the subsurface (109), the horizontal components can be simply vector-rotated to fracture strike and normal directions to produce $S_1$ and uncompensated $S_2$ seismic sections (111).

However, if the fracture orientation varies with depth (113), it is not possible to apply a single vector rotation on the whole section. In this case, layer-stripping is performed to produce an $S_1$ seismic section and a registered (or time-compensated) $S_2$ section (115). A number of methods have been published on layer stripping from surface seismic data.

To name a few, Gaiser [9, 14] published a method called "3-D converted shear wave rotation with layer stripping". Another method was published by Thomsen et al., [11] called "coarse layer stripping of vertically variable azimuthal anisotropy from shear-wave data". Granger et al., [12] developed a method to find the fast S-wave direction which corresponds to the fracture orientation. Haacke et al. [17] proposed a method of layer-stripping in marine data. Crampin [13] gave a detailed description of S-wave propagation in fractured media which led to development of the layer-stripping technique. Bansal et al. [18] developed a method to perform true-amplitude layer-stripping using surface seismic PS data. Bansal's method performsf a scan of offset and azimuths of the surface seismic data to obtain the optimum dataset to perform layer stripping.

Conventional layer-stripping techniques typically consist of four primary steps: (1) division of data in several layers (or windows), (2) rotation of the radial and transverse components to fracture strike and normal in first window to generate fast and slow S-waves, (3) cross-correlation of the fast and slow S-waves to estimate the time-difference between the two in the first window and (4) shifting the slow S-wave by the estimated time-difference to align the fast and slow S-wave events or reflections in first window. This process is performed multiple times in a top-down fashion revealing fracture orientation and S-wave time-difference of each subsequent fractured layer (or window). This process produces pure $S_1$- and registered $S_2$-mode seismic sections, with the registered $S_2$-mode seismic sections resulting from the time shifting noted above in step 4. This time shifting is necessary so that the fast and slow waves can be accurately determined in the next layer (or window). In one non-limiting embodiment, the method proposed by Bansal et al. [18] is used as the layer stripping technique. However, it must be noted that the embodiments of the present disclosure are not dependent on the type of layer stripping method used.

After the $S_1$- and $S_2$-modes have been generated, the process continues by determining the time-difference between the two S-waves. Fomel and Jin [19] previously developed a method to register time-lapse seismic images using the local similarity attribute which provides a smooth continuous measure of similarity between two images. Their solution produces a point-by-point aligned time images, time-continuous time-difference between the two images and a warping function used to align the images. There are two main advantages of this approach over traditional cross-correlation or cross-equalization approaches: (1) stability of the method and (2) generation of time-continuous time-lags and warping functions, a direct indicator of velocity change in the reservoir. However, once the $S_1$ and $S_2$ data are generated by the present inventive method, the cumulative S-wave time difference may alternatively be calculated by cross-correlation, cross-equalization, or any similar comparison method, but using the similarity attribute is preferred because of, at least, stability and robustness.

One embodiment of the present disclosure uses a similar approach to register $S_1$ and $S_2$ images and to produce a time-continuous S-wave time-difference. As appreciated by those of ordinary skill, Fomel teaches an image registration technique to remove artifact time-lapse differences caused by velocity changes. Where Fomel aligns P-wave data at different times, certain embodiments of the present disclosure align simultaneous S-wave data after it has been separated into its $S_1$ and $S_2$ modes. Because of the time-continuous nature of the time-difference, the inventive methodology allows for the computation of the S-wave time-difference between any two reflection events. Such information can lead surveyors to highly fractured zone in the subsurface.

In order to perform a similarity-based S-wave time-difference calculation, the window-based S-wave time-difference applied in step 115 on the registered slow S-wave volume is removed in order to generate an uncompensated slow S-wave ($S_2$) volume (117). A local similarity scan between $S_1$ and uncompensated $S_2$ volumes is then performed (119) to find the optimum warping function, which is the name given to a function of time that compensates the $S_2$ volume so that it is in phase with the corresponding $S_1$ volume. The warping function also indicates the extent to which the cumulative $S_2$ time shift departs from a linear function of time for a particular fracture system. The correct warping function (or warping function trend), w(t), is generated by detecting the areas of strong similarity (121) and is calculated to minimize the difference between the $S_1$ and uncompensated $S_2$ volumes when applied to the uncompensated $S_2$ volume. In some embodiments, a smoothness constrain is applied on the warping function while it is being calculated. Any kind of smoothness constrain me be applied on the warping function in time (or vertical) and/or lateral (X and Y) directions. In one embodiment, the user is prompted to provide the number of points in each direction to use in order to smooth out the warping function.

Figure 2A:
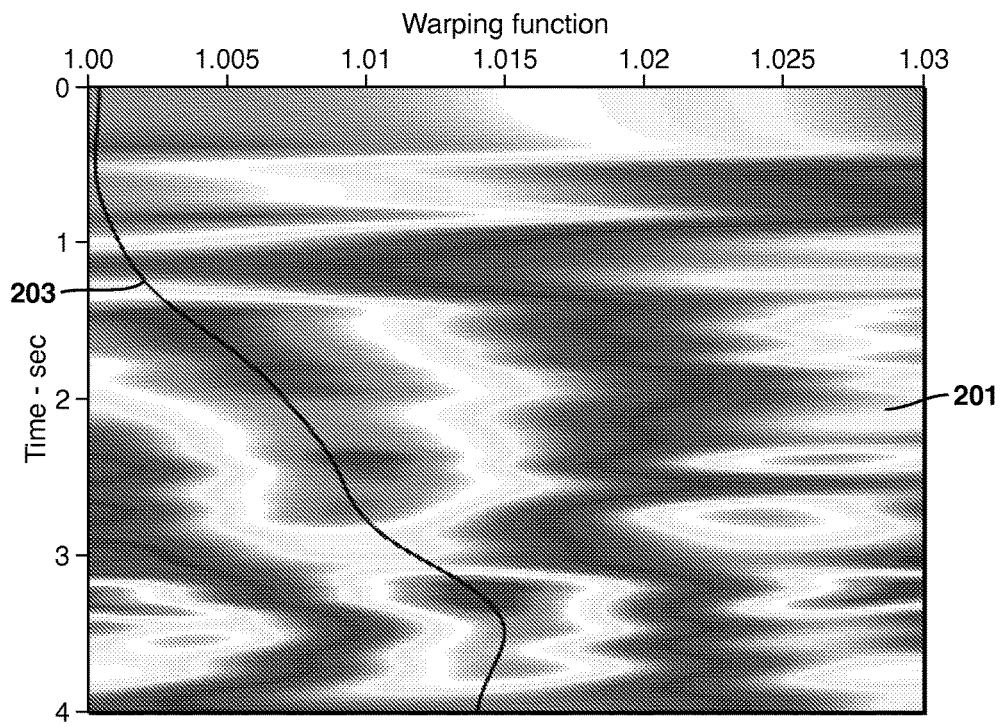
FIG. 2A depicts an exemplary similarity scan and warping function for a seismic pair.

FIG. 2A is an illustration depicting a similarity scan (201) as the background and the chosen warping function (203) for a seismic trace pair in $S_1$ and uncompensated $S_2$ seismic sections.

Figure 2B:
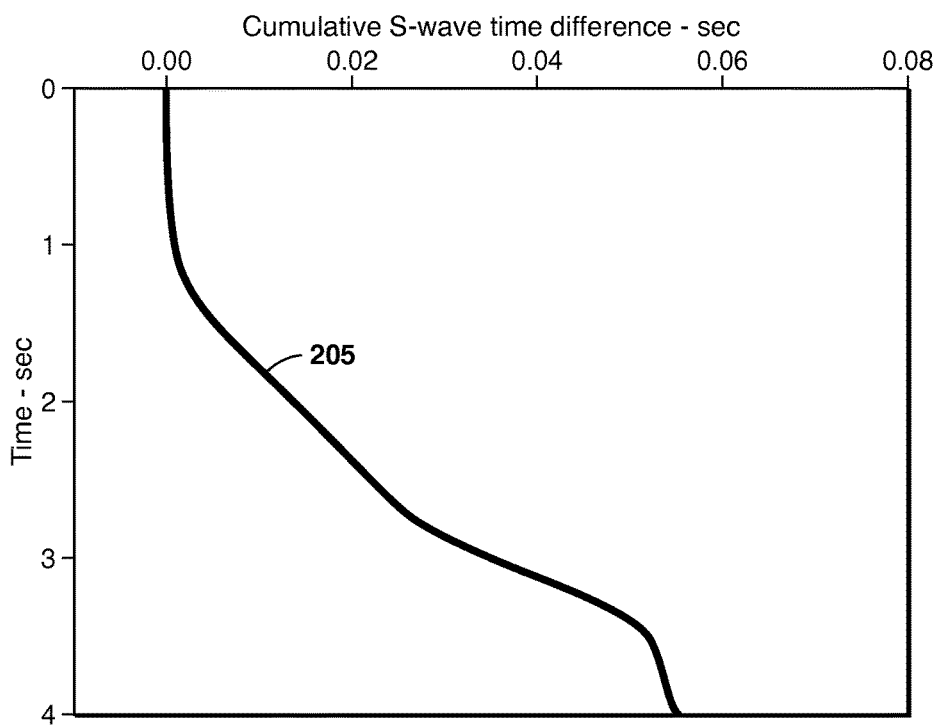
FIG. 2B depicts the cumulative S-wave time difference for the seismic trace information depicted in FIG. 2A.

Referring again to FIG. 1, based upon the generated warping function, a cumulative S-wave time-difference is then calculated (123). In one embodiment, the cumulative S-wave time-difference, $\Delta T_S^{cum}(t)$, is determined using the following equation, which follows from the definition of the warping function:

$$\Delta T_S^{cum}(t) = (w(t)-1)t, \qquad (1)$$

where t is the reflection travel time. FIG. 2B illustrates the calculated cumulative S-wave time-difference (205) as a function of time based on the warping function depicted in FIG. 2A.

Based upon the cumulative S-wave time-difference, an instantaneous S-wave time difference is calculated (125). The fracture density of a subsurface formation is directly proportional to the instantaneous S-wave time difference. In one embodiment, the instantaneous S-wave time-difference, $\delta t_S^{ins}(t)$, is determined at each seismic data time sample using the following equation:

$$\delta t_S^{ins}(t) = \frac{d\Delta T_S^{cum}(t)}{dt} \qquad (2)$$

The described process may then be performed for every trace pair in the volume, thereby resulting in a cumulative S-wave time-difference volume and an instantaneous S-wave time-difference volume being generated. In another aspect of the present disclosure, a new compensated $S_2$ volume may be generated by using $\Delta T_S^{cum}(t)$ volume to time-shift uncompensated $S_2$ volume (127).

It is important to note that the steps depicted in FIG. 1 are provided for illustrative purposes only and a particular step may not be required to perform the inventive methodology. As a non-limiting example, a survey may decide not to calculate an instantaneous S-wave time difference and also forego the generation of a new compensated $S_2$ volume based upon survey objectives and/or computer processing speed or memory. Again, the claims, and only the claims, define the inventive system and methodology.

EXAMPLE

Figure 3:
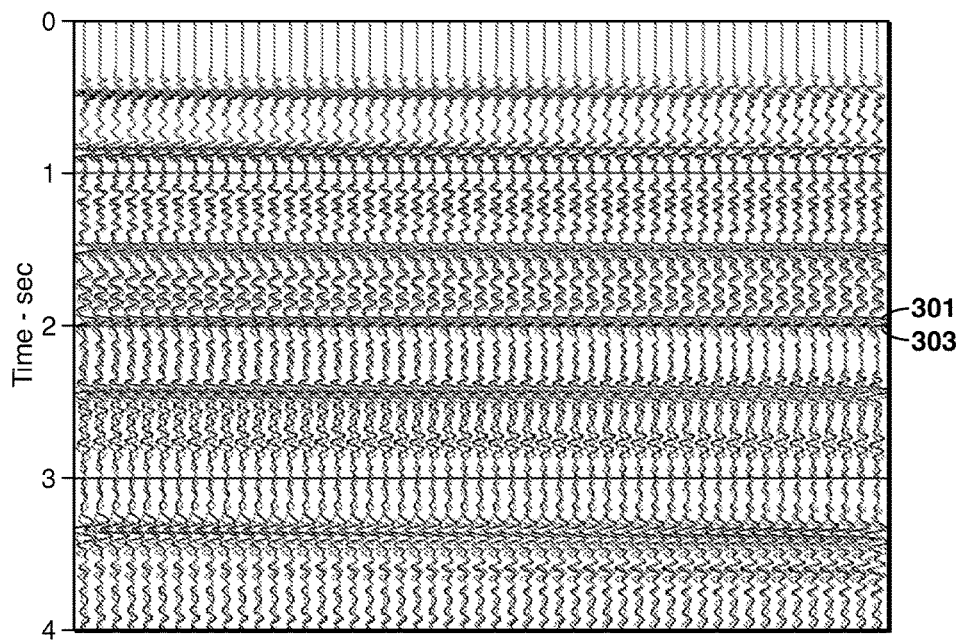
FIG. 3 illustrates $S_1$ and uncompensated $S_2$ traces.

To demonstrate applicability of the disclosed methodology, the present inventors applied the method on synthetic seismic modeling data. FIG. 3 shows $S_1$ traces (301) in black and uncompensated $S_2$ traces (303) in red. FIG. 3 illustrates that events in $S_1$ and uncompensated $S_2$ volumes are not aligned in time.

Figure 4:
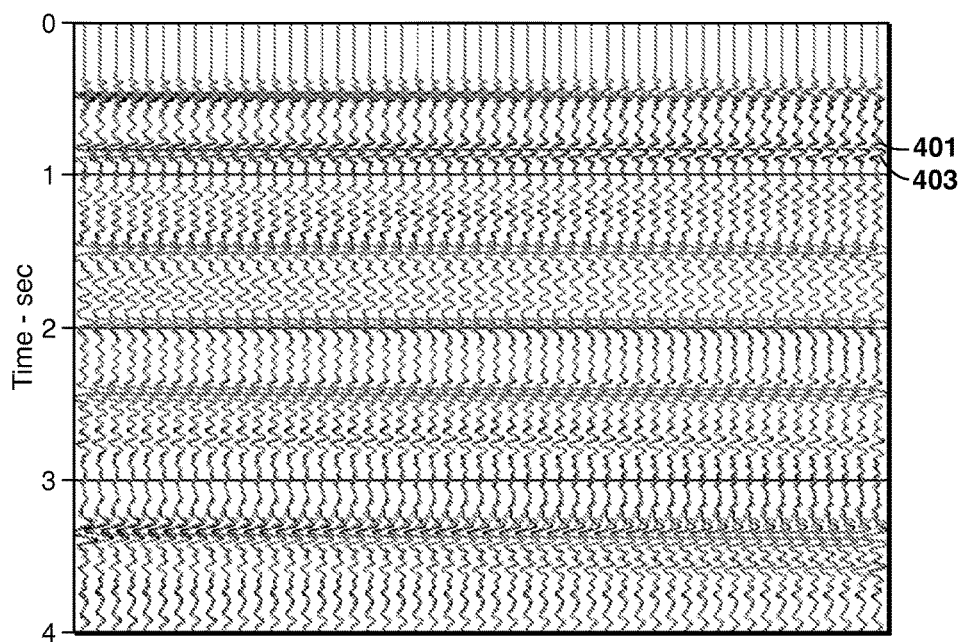
FIG. 4 illustrates $S_1$ and time compensated $S_2$ traces.
Figure 5:
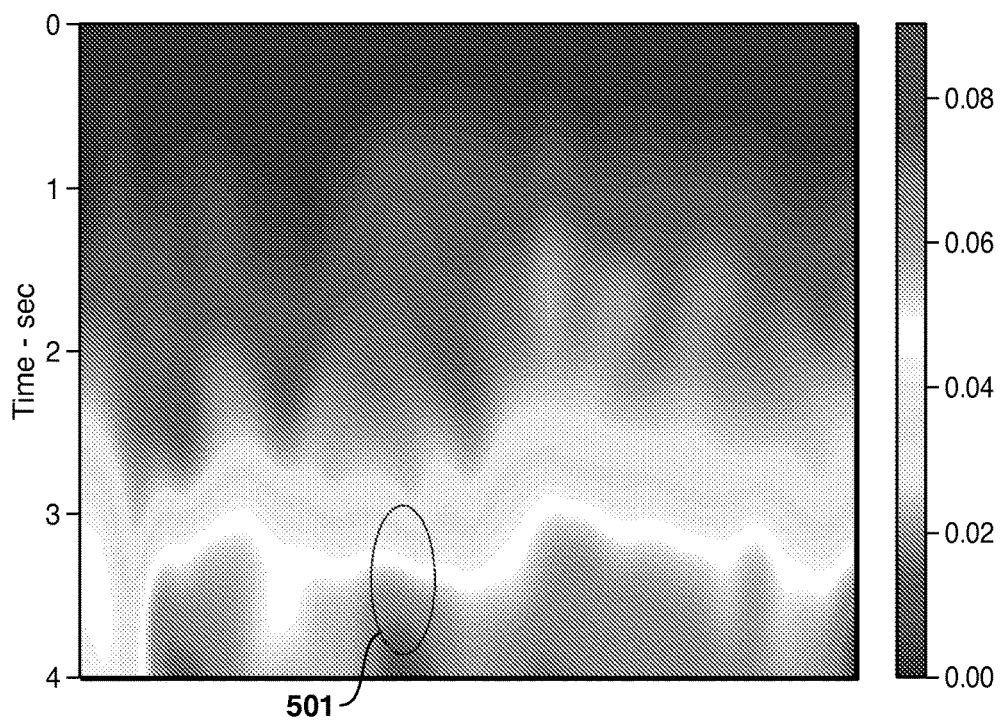
FIG. 5 illustrates a cumulative S-wave time-difference volume based on the seismic traces shown in FIGS. 3 and 4.
Figure 6:
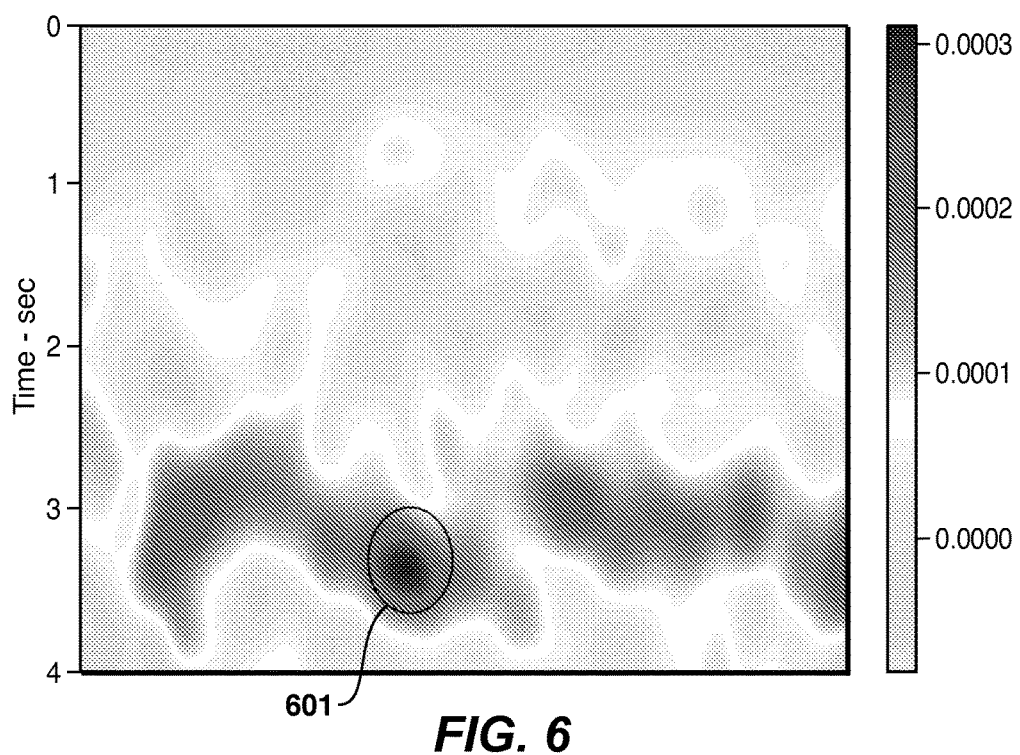
FIG. 6 illustrates an instantaneous S-wave time-difference volume based on the cumulative S-wave time-difference volume shown in FIG. 5.

FIG. 4 illustrates the $S_1$ traces (401) in black and the new compensated $S_2$ traces (403) in red. As shown, the events in $S_1$ and compensated $S_2$ volumes are now aligned. FIGS. 5 and 6 depict the $\Delta_S^{cum}(t)$ and $\delta t_S^{ins}(t)$ volumes, respectively. This information allows an operator or surveyor to compute an S-wave time lag and/or instantaneous S-wave time difference between any two reflection events. This new, additional information will help to locate highly anisotropic or fractured zones: critical information for well planning in unconventional reservoirs.

A review of FIGS. 5 and 6 shows that the fracture intensity of the subsurface formation appears to be large in an area corresponding to a travel time between 3 and 3.5 seconds. More specifically, the area of greatest fracture intensity is identified at (501) and (601) in FIGS. 5 and 6, respectively.

While the invention has been illustrated and described in detail in the drawings and foregoing description, the same is to be considered as illustrative and not restrictive in character, it being understood that only the preferred embodiments have been shown and described and that all changes and modifications that come within the wording of the claims are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

REFERENCES

1. Aguilera, R., "Naturally fracture reservoirs", PennWell Book, Tulsa, 1995.
2. Nelson, R. A., "Geologic analysis of naturally fractured reservoirs", Gulf Publishing Company, Houston, 2001.
3. Sinha, B. K., Norris, A. N. and Chang, S., "Borehole flexural modes in anisotropic formations", Geophysics 59, 1037-1052 (1994)
4. Schoenberg, M. and Douma, J., "Elastic wave propagation in media with parallel fractures and aligned cracks", Geophysical Prospecting 36, 571-590 (1988).
5. Ruger, A. and Tsvankin, I., "Using AVO for fracture detection: Analytic basis and practical solutions", The Leading Edge 16, 1429 (1997).
6. MacBeth, C. and Crampin, S., 1991, "Comparison of signal processing techniques for estimating the effects of anisotropy", Geophysical Prospecting 39, 357-386.
7. Alford, R. M., "Multisource multireceiver method and system for geophysical exploration", U.S. Pat. No. 5,343, 441 (1994).
8. Winterstein, D. F. and Meadows, M. A., "Shear-wave polarization and subsurface stress directions at Lost Hills field", Geophysics 56, 1331-1348 (1991).
9. Gaiser, J. E., "3-D converted shear wave rotation with layer stripping", U.S. Pat. No. 5,610,875 (1997).
10. Tsvankin, I., "Seismic signatures and analysis of reflection data in anisotropic media", Pergamon, New York (2001).
11. Thomsen, L., Tsvankin, I. and Mueller, M. C., "Coarse-layer stripping of vertically variable azimuthal anisotropy from shear-wave data", Geophysics, 64, 1126-1138 (1999).
12. Granger, P. Y., Bonnot, J. M., Gresillaud, A. and Rollet, A., "C-wave resolution enhancement through birefringence compensation at the Valhall field", Society of Exploration Geophysicist Annual Conference, 2001.
13. Crampin, S., "Evaluation of anisotropy by shear-wave splitting", Geophysics, 50, 142-152 (1985).
14. Gaiser, J. E., "Application for vector coordinate systems of 3-D converted-wave data", The Leading Edge, 18, 1290-1300 (1999).
15. Alford, R. M., "Shear data in the presence of azimuthal anisotropy: Dilley, Tex.", SEG Expanded Abstracts, 5, 476-479 (1986).
16. Thomsen, L., "Converted-wave reflection seismology over inhomogeneous media", Geophysics, 64, 678-690 (1999).
17. Haacke, R. R., Westbrook, G. K. and Peacock, S., "Layer stripping of shear-wave splitting in marine PS waves", Geophysical Journal International, 176, 782-804 (2009).
18. Bansal, R., Matheney M. and Liu, E., "True—amplitude Layer-stripping in fractured media", U.S. Patent Application No. 61/484,949.
19. Fomel, S. and Jin, L., 2009, "Time-lapse image registration using the local similarity attribute", Geophysics, 74, A7-A11.
20. Bakulin, A., Grechka, V., and Tsvankin, I., "Estimation of fracture parameters from reflection seismic data—Part I: HTI model due to a single fracture set", Geophysics 65, 1788 (2000)

What is claimed is:

1. A method, comprising:
obtaining S-wave seismic data of a subsurface formation, wherein the S-wave seismic data is acquired from the subsurface formation using multi-component receivers adapted to measure a plurality of motion vector components including two horizontal components, the S-wave seismic data comprising a plurality of seismic time samples;
separating the S-wave seismic data into fast ("$S_1$") and slow ("$S_2$") data;
using a computer to compute local similarity of the $S_1$ and $S_2$ data at each time sample;
using a computer to compute at each time sample a cumulative time-difference by which the $S_2$ data lags the $S_1$ data from the local similarity, wherein computing the cumulative time-difference includes,
performing a local similarity attribute scan between the $S_1$ and $S_2$ data;
generating a warping function, w(t), by detecting areas of similarity in the local similarity attribute scan, and determining the cumulative time-difference, $\Delta T_S^{cum}(t)$, based upon w(t);
calculating an instantaneous S-wave time-difference, $\delta t_S^{ins}(t)$, at each seismic time sample from the cumulative S-wave time difference;
estimating fracture density within the subsurface formation from the cumulative time-difference, $\Delta T_S^{cum}(t)$; and drilling a well into the subsurface formation based at least in part on the fracture density.

2. The method of claim 1, wherein the cumulative time-difference, $\Delta T_S^{cum}(t)$, is determined using a formula that can be expressed as $$\Delta T_S^{cum}(t) = (w(t)-1)t,$$

where t is reflection travel time.

3. The method of claim 1, further comprising:
generating time-compensated $S_2$ data based upon the $\rightarrow T_S^{cum}(t)$ to time shift the $S_2$ data.

4. The method of claim 1, wherein the subsurface formation has a primary fracture direction, the $S_1$ and $S_2$ data is generated by vector-rotating the horizontal components to directions parallel and normal to the primary fracture direction.

5. The method of claim 1, wherein the $S_1$ and $S_2$ data are generated by performing a layer stripping process on the S-wave seismic data to generate the $S_1$ data and a registered $S_2$ data which has a time-difference applied and removing the time-difference applied to the registered $S_2$ data to generate the $S_2$ data.

6. The method of claim 1, wherein the instantaneous S-wave time-difference is calculated using a formula that can be expressed as $$\delta t_S^{ins}(t) = \frac{d\Delta T_S^{cum}(t)}{dt}.$$

7. The method of claim 6, further comprising:
estimating the fracture density based on $\delta_S^{ins}(t)$.

8. The method of claim 1, further comprising:
producing hydrocarbons from the well.

* * * * *